(12) United States Patent
DeRosa

(10) Patent No.: US 7,964,126 B2
(45) Date of Patent: Jun. 21, 2011

(54) METHOD OF PREVENTING GRAVITY-INDUCED DEFORMATION OF CERAMIC GREEN BODIES

(75) Inventor: Michael Edward DeRosa, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 298 days.

(21) Appl. No.: 12/271,248

(22) Filed: Nov. 14, 2008

(65) Prior Publication Data

US 2010/0123266 A1  May 20, 2010

(51) Int. Cl.
*B01J 8/00* (2006.01)
(52) U.S. Cl. .............. 264/177.18; 264/177.17; 264/183; 264/184; 264/343
(58) Field of Classification Search ............. 264/177.12, 264/177.18, 183, 184, 232, 343; 422/292
See application file for complete search history.

(56) References Cited

U.S. PATENT DOCUMENTS

| | | | | |
|---|---|---|---|---|
| 3,222,435 A | * | 12/1965 | Mellen, Jr. et al. | ............. 264/28 |
| 4,725,391 A | * | 2/1988 | Bardhan et al. | ................. 264/82 |
| 5,258,205 A | | 11/1993 | Wu | |
| 5,632,382 A | | 5/1997 | Patrick et al. | |
| 5,797,081 A | | 8/1998 | Brundage et al. | |
| 5,811,071 A | * | 9/1998 | Emblem et al. | ............... 423/596 |
| 5,914,437 A | | 6/1999 | Chandross et al. | |
| 2009/0143221 A1 | * | 6/2009 | Ogunwumi et al. | ............ 502/67 |

FOREIGN PATENT DOCUMENTS

| | | | |
|---|---|---|---|
| JP | 58148940 A | * | 9/1983 |
| WO | 9521900 | | 8/1995 |

OTHER PUBLICATIONS

JPO English Abstract of JP 58148940, 1983.*
http://en.wikipedia.org/wiki/Ethylene_glycol, 2010.*
http://en.wikipedia.org/wiki/Glycerol, 2010.*
http://www.wacker.com/cms/en/products-markets/products/product.jsp?product=9876, 2010.*
http://dowwolff.custhelp.com/app/answers/detail/a_id/774/related/1/session/L2F2LzEvdGItZS8xMjg4NjQwNDAwL3NpZC9ZUDhCb1pka-w%3D%3D/~/methocel-direct-compression-(dc)-grades, 2010.*
Popescu et al, Chemical Modified Zeolythes, Rom. Journ. Phys., vol. 51, Nos. 1-2, pp. 293-297, 2006.*
http://en.wikipedia.org/wiki/Sorbitol, 2010.*
http://www.alibaba.com/product-gs/207661162/Sorbitol_Solution_70_.html, 2010.*
http://en.wikipedia.org/wiki/Float_glass (retrieved Apr. 14, 2011).*
http://arcfluids.com/formate.htm, (Nov. 5, 2008).
S. Q. Liu, et al; "Effects of Salts in the Hofmeister Series and Solvent Isotapes on the Gelation Mechanisms for Hydroxypropylmethylcellulose Hydrogels"; Journal of Applied Polymer Science, vol. 109, 336-372 (2008).

* cited by examiner

*Primary Examiner* — Joseph S Del Sole
*Assistant Examiner* — Timothy Kennedy
(74) *Attorney, Agent, or Firm* — Robert P. Santandrea; Kees van der Sterre

(57) ABSTRACT

A method of preventing gravity-induced deformation of a ceramic green body. The method comprises providing a ceramic green body and disposing the body in a fluid medium bath having a density that is greater than or equal to that of the ceramic green body. The green body is suspended and floats freely in the fluid medium, and deformation of the green body due to its own weight is prevented. Outer or peripheral portions of the ceramic green body may also be stiffened when the fluid medium bath comprises an aqueous salt solution comes into contact with the green body and causes gelation of a binder within the ceramic green body.

23 Claims, 6 Drawing Sheets

METHOD OF PREVENTING
GRAVITY-INDUCED DEFORMATION OF
CERAMIC GREEN BODIES

BACKGROUND

The invention relates to a method of handling ceramic green bodies. More particularly, the invention relates to handling such green bodies without incurring gravity-induced deformation of such bodies. Even more particularly, the invention relates to preventing gravity-induced deformation while simultaneously strengthening such ceramic green bodies.

Large, complex green ceramic bodies are often prone to deformation, such as sagging or slumping, during their manufacture due to their size. Green honeycomb structures, for example, having very large frontal areas and a large number of thin-walled cells are prone to cell collapse on the bottom portion of the part due to the large part size, increased part weight, and weakness of the wall/cell structure.

Multiple solutions to alleviate the deformation/collapse problem have been explored. Extruded bodies have been irradiated with microwave radiation upon exiting an extruding apparatus to gel the binder within the body and thus strengthen the body. While this process is effective for small parts, is has not proven effective for larger green bodies. Another approach is to apply a gelation-facilitating solution to the ceramic green body by either total immersion of the body or spraying its outer surface. Such processes require large amounts of water, which must be later drained from the green body structure, and thus require additional steps for removal of the excess liquid.

SUMMARY

The present invention provides a method of preventing gravity-induced deformation (also referred to herein as weight-induced deformation) of a ceramic green body. The method comprises providing a ceramic green body and disposing the body in a fluid medium bath having a density that is greater than or equal to that of the ceramic green body. The green body is suspended and floats freely in the fluid medium, and deformation of the green body due to its own weight is prevented. Outer or peripheral portions of the ceramic green body may also be stiffened when the fluid medium bath comprises an aqueous salt solution that comes into contact with the green body and causes gelation of a binder within the ceramic green body.

Accordingly, one aspect of the invention is to provide a method of preventing gravity-induced deformation of a ceramic green body. The method comprises the steps of: providing the ceramic green body; and disposing the ceramic green body in a fluid medium bath having a density that is greater than or equal to that of the ceramic green body, wherein contact between the ceramic green body and the fluid medium bath prevents deformation of the ceramic green body.

A second aspect of the invention is to provide a method of strengthening a ceramic green body. The method comprises the steps of: providing the ceramic green body, the ceramic green body comprising a water soluble polymeric binder; disposing the ceramic green body in a fluid medium bath having a density that is greater than that of the ceramic green body; and reacting the fluid medium with the water soluble polymeric binder in a portion of the ceramic green body to gel the water soluble polymeric binder, wherein gelling the water soluble polymeric binder strengthens the portion of the ceramic green body.

A third aspect of the invention is to provide a method of preventing gravity-induced deformation and wall collapse of a ceramic green body. The method comprises the steps of: providing the ceramic green body, the ceramic green body comprising a water soluble polymeric binder; disposing the ceramic green body in a fluid medium bath having a density that is greater than or equal to that of the ceramic green body, wherein contact between the ceramic green body and the fluid medium bath prevents deformation of the ceramic green body; and reacting the fluid medium with the water soluble polymeric binder in a portion of the ceramic green body to gel the water soluble polymeric binder, wherein gelling the water soluble polymeric binder strengthens the portion of the ceramic green body, and wherein the strengthening of the portion prevents wall collapse.

A fourth aspect of the invention is to provide a system for preventing deformation and wall collapse of a ceramic green body. The system comprises: a vessel capable of accepting a ceramic green body having a first density; and a fluid medium bath disposed in the vessel, the fluid medium bath having a second density that is greater than or equal to the first density, wherein the fluid medium bath supports the ceramic green body.

These and other aspects, advantages, and salient features of the present invention will become apparent from the following detailed description, the accompanying drawings, and the appended claims.

DETAILED DESCRIPTION

Figure 1:
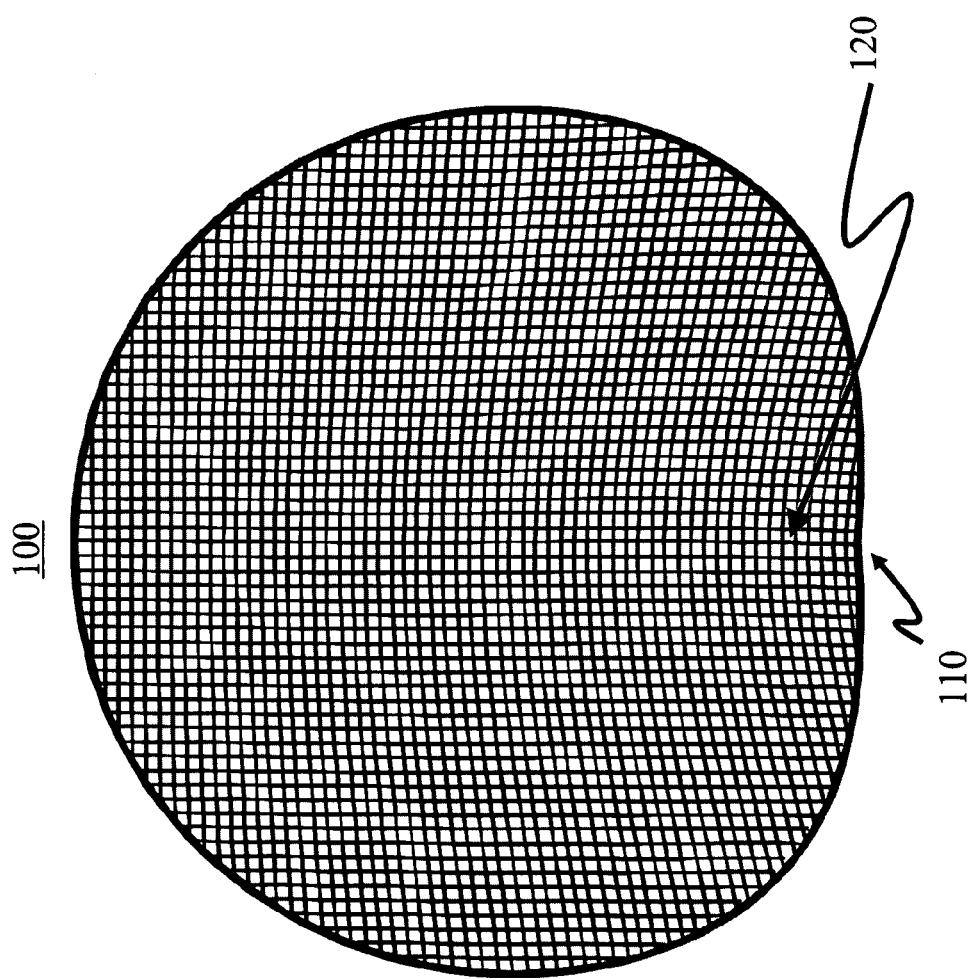
FIG. 1 is a schematic showing gravity-induced deformation in a green cordierite honeycomb body.

In the following description, like reference characters designate like or corresponding parts throughout the several views shown in the figures. It is also understood that, unless otherwise specified, terms such as "top," "bottom," "outward," "inward," and the like are words of convenience and are not to be construed as limiting terms. In addition, whenever a group is described as comprising at least one of a group of elements and combinations thereof, it is understood that the group may comprise, consist essentially of, or consist of any number of those elements recited, either individually or in combination with each other. Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range.

Referring to the drawings in general and to FIG. 1 in particular, it will be understood that the illustrations are for the purpose of describing a particular embodiment of the invention and are not intended to limit the invention thereto. The drawings are not necessarily to scale, and certain features and certain views of the drawings may be shown exaggerated in scale or in schematic in the interest of clarity and conciseness.

As used herein, the terms "green body" or "ceramic green body" refer to an unsintered body, part, or ware before firing, unless otherwise specified. The green body contains a vehicle, such as water, and typically comprises at least one precursor of a ceramic material. In addition, the green body may also include other materials such as binders, pore formers, stabilizers, and the like.

Ceramic green bodies often balance softness/deformability for shape molding and structural integrity for shape retention. Due to their size, large, complex green ceramic bodies often lack sufficient strength or stiffness to be self-supporting, and are prone to deformation, such as sagging, slumping, wall and/or cell collapse, or the like, during their manufacture due to their size. Honeycomb structures serve as a prime example of such green ceramic bodies. Honeycomb structures may have very large frontal areas and a large number of thin-walled cells. Some examples of such honeycomb structures have diameters of about in 13 inches (about 32.5 cm) in diameter and cell densities of about 400 per square inch with cell wall thicknesses of about 0.004 inch (about 0.1 mm). Such green ceramic bodies experience cell collapse on the bottom portion of the part due to the large part size, increased part weight, and weakness of the wall/cell structure.

An example of gravity-caused deformation is shown in FIG. 1, which is a photograph of a cordierite green body 100 having a honeycomb structure. The portion 110 of the outer wall upon which cordierite green body 100 rests is deformed, and a portion 120 of the cells of the honeycomb structure proximate to the deformed portion 110 of the outer wall have collapsed.

One effective method of countering the effects of gravity on a large ceramic green body is to use the buoyancy of the body to support it in a fluid medium bath. Accordingly, a method of reducing gravity-induced deformation of a ceramic green body is provided. In the method, a ceramic green body is provided and disposed in a fluid medium bath that has a density that is less than or equal to the density of the ceramic green body. The ceramic green body is typically disposed in a container that holds the fluid medium bath and is sufficiently large to accommodate the ceramic green body. Because the fluid medium bath is of equal or greater density than the ceramic green body, the ceramic body is buoyant within the fluid medium bath and therefore floats freely (i.e., the ceramic green body is not suspended by other means, such as wires, arms, or the like, that bear a portion of the weight of the body) in the fluid medium bath. Deformation, including cell or wall collapse, sagging, or slumping, of the ceramic green body under its own weight is therefore prevented.

In one embodiment, the ceramic green body is one of a cordierite green body, an aluminum titanate green body, an inorganic carbide green body, a zeolite green body, and combinations thereof. The ceramic green body may be formed into a honeycomb structure, a plate, sheet, rod, or the like by forming methods known in the art, such as, but not limited to, extrusion, molding, casting, and the like. In a non-limiting example, schematically shown in FIG. 2, an extruded ceramic green body 220 is directed into a trough 220 containing fluid medium 210 as it exits an extrusion die 245.

The fluid medium bath, as previously described, has a density that is greater than or equal to that of the ceramic green body. In one embodiment, the fluid medium bath has a density of at least 1.5 g/cm$^3$. In a particular embodiment, the density of the fluid medium bath is in a range from about 1.5 g/cm$^3$ up to about 3.0 g/cm$^3$. In one non-limiting example, a ceramic paste of a cordierite composition used for thin-wall or ultra thin-wall honeycomb structures is extruded directly into a trough containing a high density salt solution. The salt solution has a density that is controlled to be in the range from 2.0 g/cm$^3$ up to 3.0 g/cm$^3$. The density of the salt solution is sufficiently high to provide buoyancy to cordierite products in the plasticized, de-aired state, such products having a density ranging from about 1.95 g/cm$^3$ up to 2.0 g/cm$^3$.

The fluid medium bath is an aqueous solution comprising ions that contain heavy atoms or ions that increase the density of the solution, thus providing the fluid medium with a density that is greater than or equal to that of the ceramic green body. The high density of the fluid medium allows the ceramic green body to freely float in the bath. For example, the aqueous solution may comprise water soluble salts of heavy alkali and alkali earth metals or the like. Non-limiting samples of such salts include formates or acetates of potassium, rubidium, cesium, and strontium. In another embodiment, the fluid medium bath may comprise water soluble salts of light (i.e., lithium and sodium) alkali metals, alkali earth metals, transition metals, and ammonia. Non-limiting examples of such water soluble salts include salts having heavy anions such as tungstates, metatungstates (also referred to as polytungstates), molybdenates, or the like, and quaternary ammonium salts. Such aqueous solutions have the added advantage of being safer to handle than high density organic fluids such as tetraboromethane and bromoform. In addition, the high density salt solutions described herein have low viscosities, which facilitates draining the solution from ceramic green bodies.

In one embodiment, the aqueous solution comprises at least one water soluble salt of an alkali metal, an alkali earth metal, a transition metal, ammonia, and combinations thereof. Each water soluble salt may be present in any concentration up to its solubility limit. In one embodiment, the concentration of a salt in the fluid medium bath is in a range from about 10 wt % up to about 90 wt %. In a particular embodiment, the water soluble salts are selected to minimize corrosion of the ceramic green body. Non-limiting examples of such salts include: cesium formate or acetate; rubidium formate or acetate; potassium formate or acetate; alkali metal tungstates (such as sodium tungstate or metatungstate, lithium tungstate or metatungstate, and the like) or molybdenates; ammonium tungstates, metatungstates molybdenates, and combinations thereof; ammonium formates or acetates; tetramethyl, tetraethyl, or tetrapropyl ammonium; combinations thereof; and the like. Water soluble chloride salts are less preferred for use in the fluid medium bath due to their potential corrosion of the ceramic green body.

A method of strengthening a ceramic green body is also provided. A ceramic green body, such as those previously described herein, is first provided. The ceramic green body, in one embodiment, comprises a water soluble polymeric binder. Such polymer binders include, but are not limited to, hydrophobically modified cellulose binders (e.g., Methocel®) and the like that gel at temperature a predetermined temperature (gelation temperature). Ceramic green bodies are plastically deformable, and tend to be worked and formed at temperatures just below the gel point of the water soluble polymeric binder. The ceramic green body is disposed in a fluid medium bath having a density that is greater than or equal to the density of the ceramic green body. The fluid medium bath is an aqueous solution comprising at least one water soluble salt, such as those salts previously described herein. The aqueous solution diffuses into an outer portion or periphery of the ceramic green body in contact with or proximate to the fluid medium bath, where the anions within the solution lower the gelation temperature of the water soluble polymeric binder (or "salt out" the binder) in the portion. The lowering of the gelation temperature or "salting out" of the water soluble polymeric binder causes gelation of the binder, stiffening and strengthening the outer portion or periphery of the ceramic green body and make the green body easier to handle. The ceramic green body may be rotated in the fluid medium bath to strengthen or stiffen the entire periphery of the green body.

Other methods of strengthening the ceramic green body include total immersion of the body in a gelling solution or spraying the outer walls of the body with such solutions to salt out the ceramic green body. Although such chemical methods stiffen the ceramic green body, they require large amounts of water, which later need to be drained and removed from the body, thus adding an additional step to the process. The methods for strengthening and stiffening a ceramic green body described herein provide an advantage over such methods in they use low viscosity, high density salt solutions that facilitate drainage of any residual fluid from the body.

The methods of preventing gravity-induced deformation and strengthening a ceramic green body that are described herein may be combined to provide a method of preventing gravity-induced deformation and wall collapse of a ceramic green body. A ceramic green body comprising a polymer binder is first provided, as previously described herein. The green body is then disposed in a fluid medium bath, also previously described herein, which comprises an aqueous solution containing at least one water soluble salt. The fluid medium bath has a density that is greater than or equal to that of the ceramic green body, and supports the green body, thus preventing gravity-induced deformation of the ceramic green body. Upon disposing the ceramic green body in the fluid medium bath, the aqueous solution diffuses into an outer portion or periphery of the ceramic green body in contact with or proximate to the fluid medium bath. Anions in the solution react with the polymer binder, lowering the gelation temperature of the binder—or "salting out" the binder—in the portion of the green body, stiffening and strengthening that portion of the ceramic green body. This method simultaneously preserves the shape of the ceramic green body while stiffening the periphery of its structure or any portion of the green body that contacts the fluid medium bath, thus improving ease of handling of the ceramic green body after extraction from the fluid medium bath.

Figure 2:
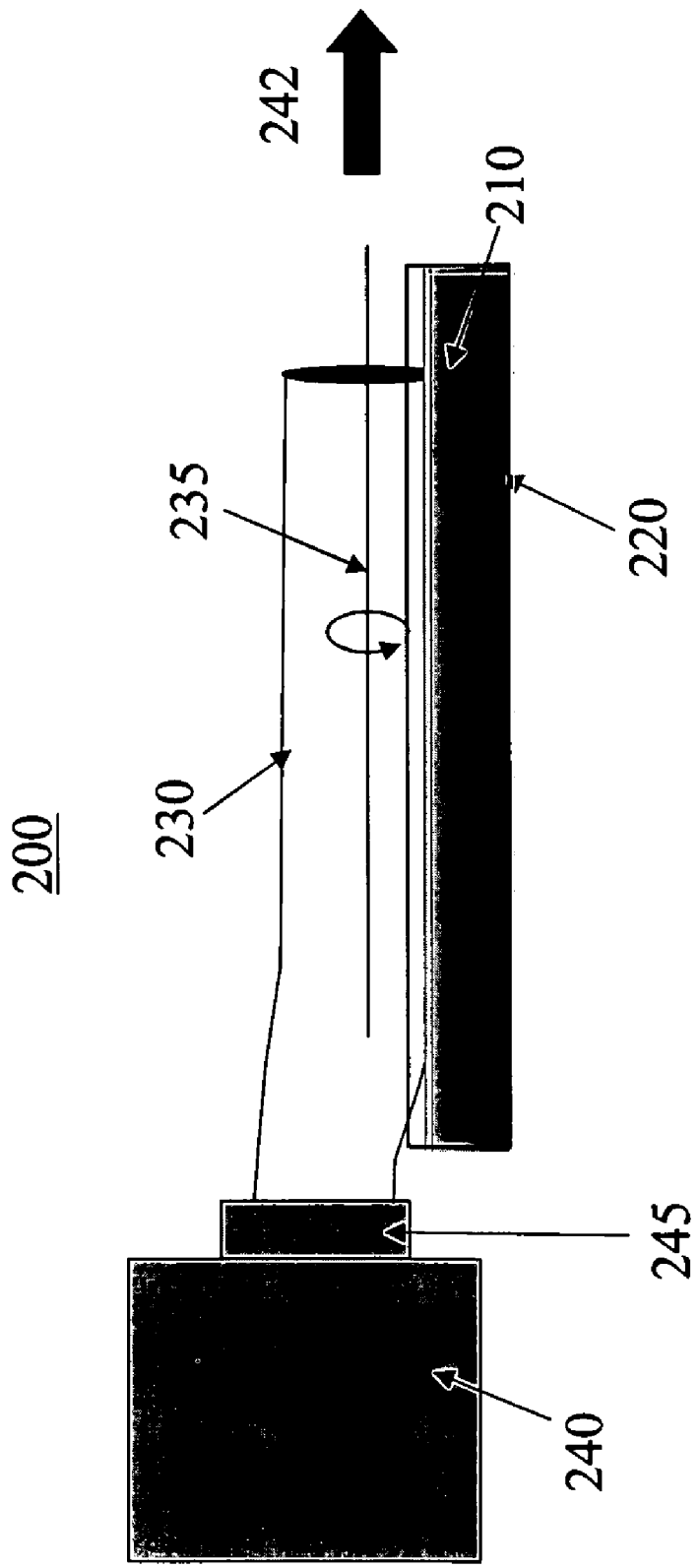
FIG. 2 is a schematic side view of a system for supporting and preventing gravity-induced deformation of a ceramic green body.

A system for supporting and preventing gravity induced deformation of a ceramic green body is also provided. A side view of the system is schematically shown in FIG. 2. System 200 includes a vessel 210 that is capable of containing a fluid medium bath 220 and a ceramic green body 230. Vessel 210 is constructed from a material that essentially chemically inert with respect to both fluid medium bath 220 and ceramic green body 230. Fluid medium bath 220, as previously described hereinabove, comprises an aqueous solution containing at least one water soluble salt and has a density that is greater than or equal to that of ceramic green body 230, and supports ceramic green body, thus preventing gravity-induced deformation or sagging of ceramic green body 230.

As shown in FIG. 2, system 200 is deployed adjacent to an extrusion apparatus 240 having an extrusion die 245. Ceramic green body 230 exits extrusion die 245 and is directed into vessel 220, which contains a fluid medium bath 210 and is trough-like in shape to accommodate ceramic green body 230. After exiting extrusion die 245 ceramic green body 230 floats freely on the high density fluid medium bath 210, since the density of ceramic green body 230 is less than or equal to that of fluid medium bath 210. The ceramic green body may be cut into pieces upon exiting extrusion die 245, or while floating in fluid medium bath 210. As previously described herein, ceramic green body 230, once cut into a free piece, may be rotated along its longitudinal axis 235 to allow the entire exterior of ceramic green body 230 to come in contact with fluid medium bath 210, allowing the exterior portion of ceramic green body 230 to be stiffened and strengthened. Ceramic green body 230 may then be extracted and transferred from vessel onto a handling system such as, for example, an air bearing system, for further processing.

EXAMPLES

The following examples illustrate the features and advantages of the invention and in no way are intended to limit the invention thereto.

Example 1

Figure 3:
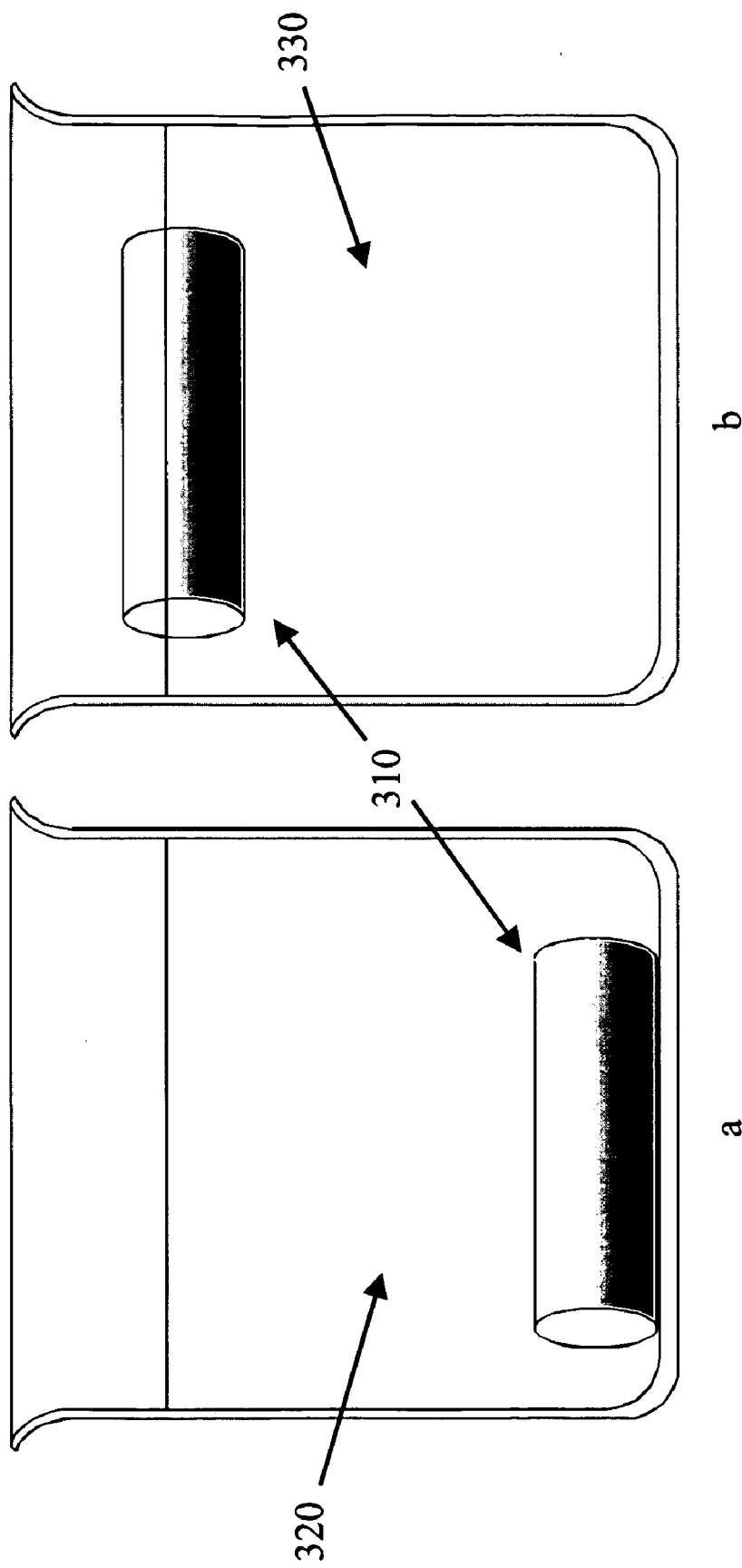
FIG. 3a is a schematic of an extruded cordierite rod in the wet green state placed in a water bath.
FIG. 3b is a schematic of an extruded cordierite rod in the wet green state placed in a cesium formate solution buoyancy bath.

A solid cordierite rod in the wet green state and having a diameter of 13 mm diameter was placed in a water bath. An identical cordierite rod was placed a buoyancy fluid bath of an aqueous cesium formate solution having a density of 2.12 g/cm$^3$. The rods were placed in the respective baths immediately after extrusion. The extruded rods had densities in the 1.95-1.98 g/cm$^3$ range. Photographs of the cordierite rods in the water and cesium formate solution buoyancy baths are shown in FIGS. 3a and 3b, respectively. The cordierite rod 310 sunk to the bottom of the water bath 320, whereas cordierite rod 312 floated in the denser cesium formate buoyancy bath 330.

Example 2

Figure 4:
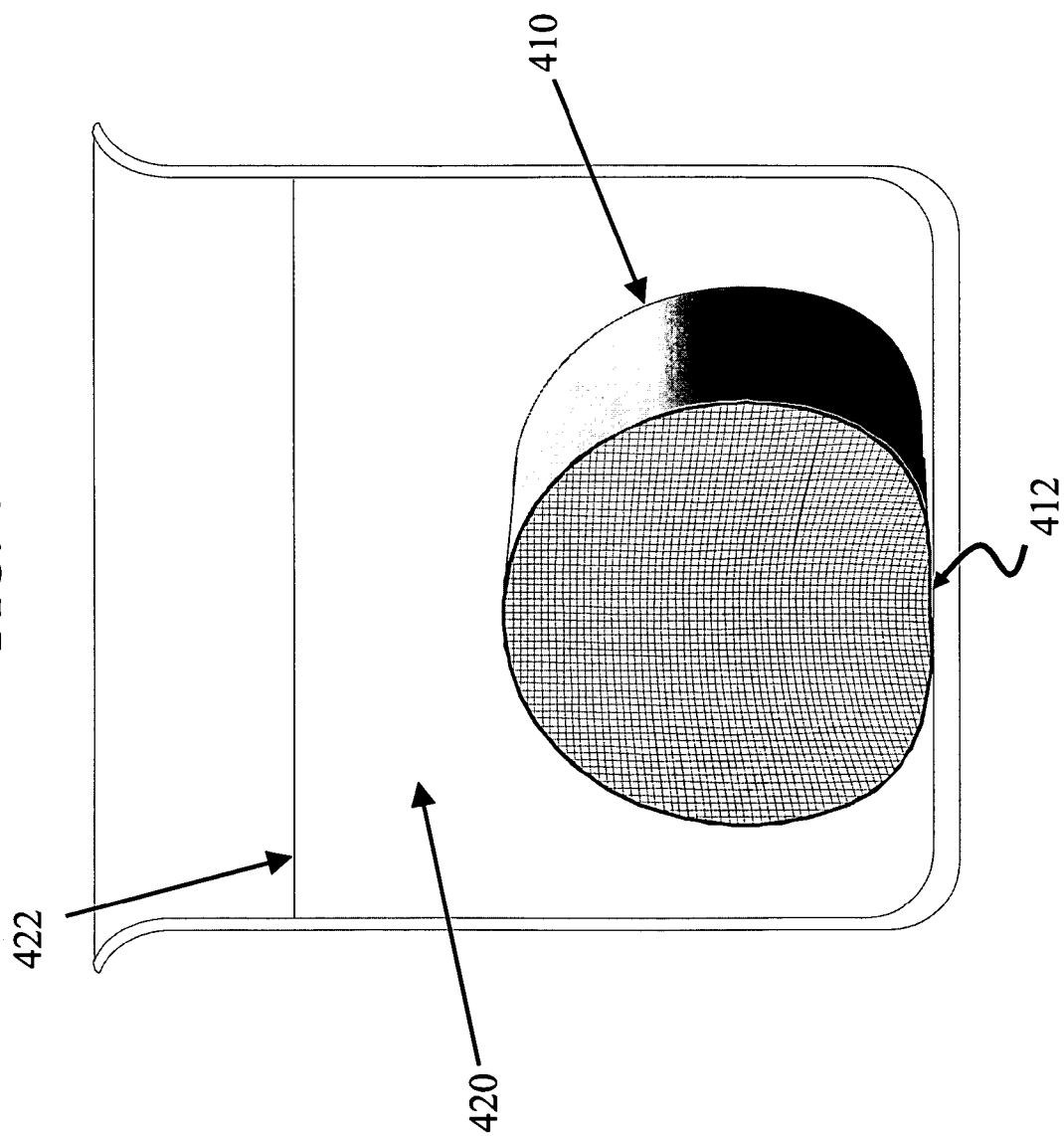
FIG. 4 is a front view schematicphotograph of an extruded cordierite honeycomb ware in the wet green state placed in a water bath.

Cordierite honeycomb ware having a 2 inch (about 5 cm) diameter and a 400/4 cell geometry (400 cells per square inch, 0.004 inch cell wall thickness) were extruded on a 40 mm twin screw extruder. All cordierite honeycomb ware comprised a cellulose binder (e.g., Methocel®). Immediately after extrusion, 4-5 inch long sections of the ware were placed in containers filled with either water or cesium formate solution. Front and side view photographs of the behavior of the honeycomb ware in the water bath are shown in FIGS. 4a and 4b, respectively. and cesium formate buoyancy baths. When placed in the water bath 420 (FIGS. 4a and 4b), ware 410 quickly sank to the bottom of the bath, with the weight of ware causing a portion 412 of ware to collapse. In addition, the ware 410 dissolved in the water and became slippery and difficult to handle. When placed in the cesium formate solution bath 430 (FIGS. 4c and 4d), the ware 410 floats easily on the surface of the buoyancy bath 430. After rolling ware 410 in the cesium formate bath 430 to stiffen the entire periphery of ware 410, ware 410 could be handled and removed from the cesium formate solution bath 430 without damage to the ware.

Penetrometer tests were carried out to verify that the outer portion of ware 410 was stiffened by contact with the cesium formate bath 430. The stiffness of a control piece (i.e., not exposed to cesium formate) of ware taken from immediately the extruder was first measured using a motorized penetrometer. To determine the effect of placing the ware in the cesium formate solution on the stiffness of the honeycomb ware, penetrometer measurements were carried out three samples of ware that had been floated and rotated (rolled) for 60-90 seconds in the previously described cesium formate solution.

Figure 5:
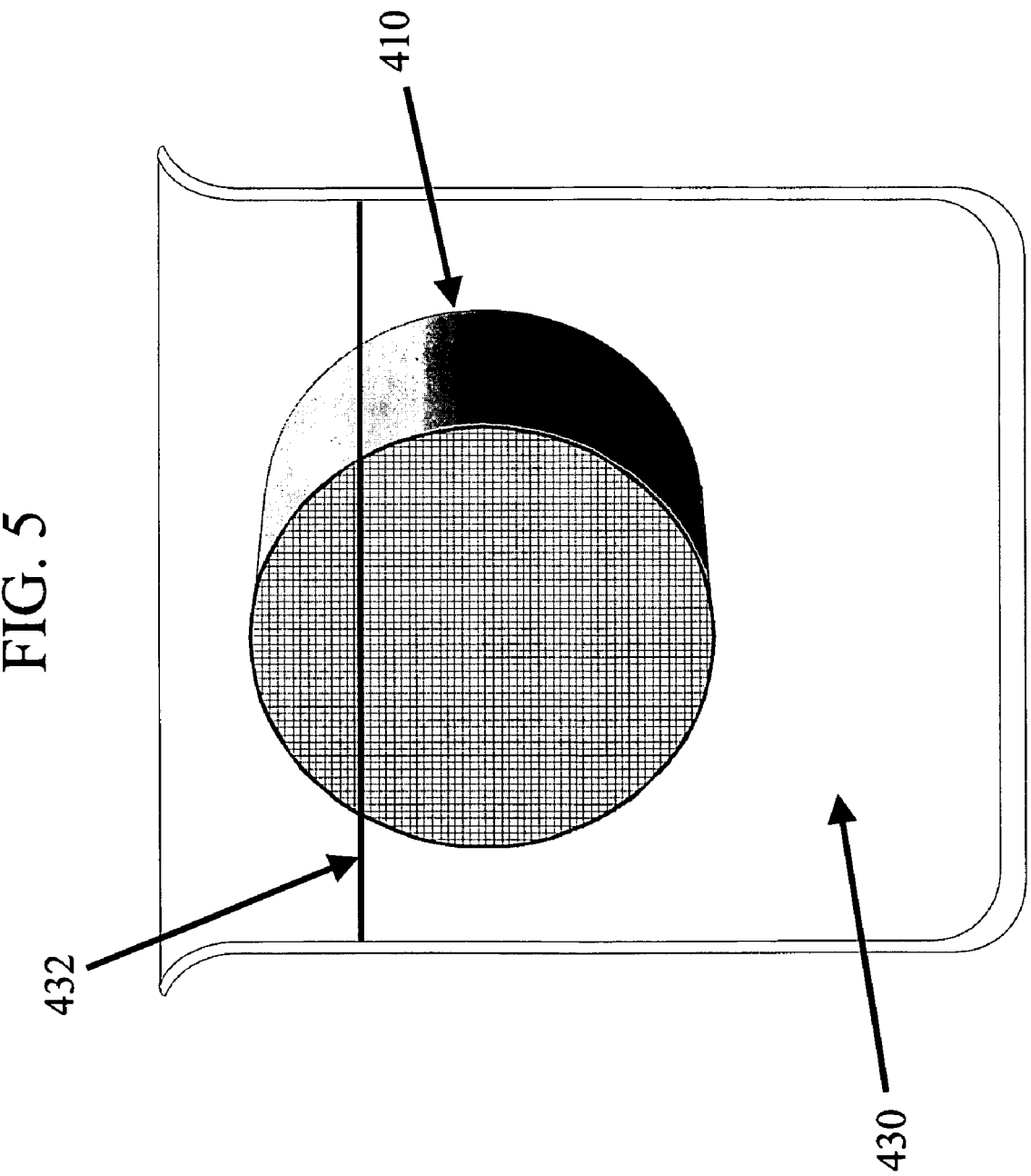
FIG. 5 is a front view schematic of an extruded cordierite honeycomb ware in the wet green state placed in a cesium formate solution buoyancy bath.
Figure 6:
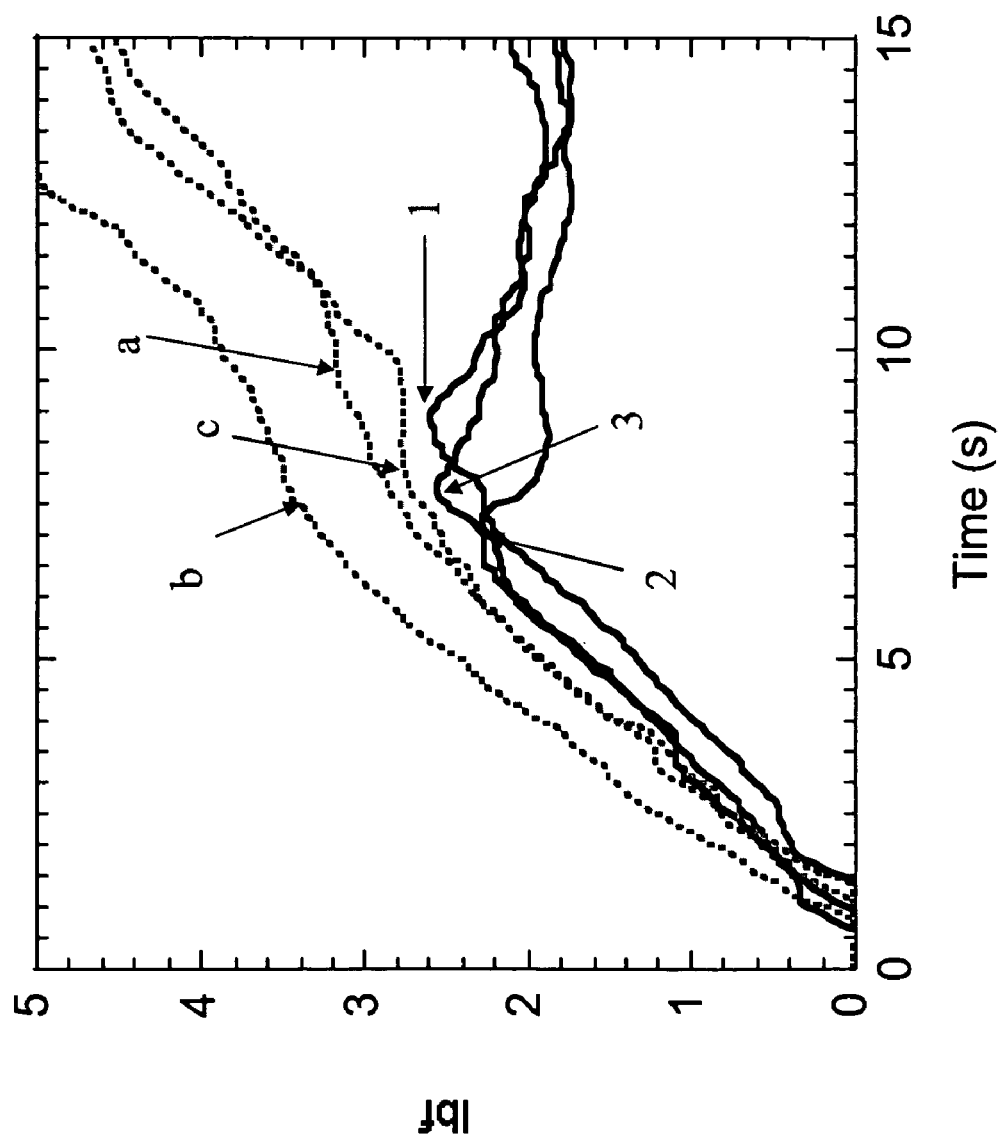
FIG. 6 is a plot of penetrometer results obtained for control samples of extruded cordierite honeycomb ware and extruded cordierite honeycomb ware that had been placed in a cesium formate solution buoyancy bath.

Penetrometer results obtained for the control samples (1-3) and cesium formate-exposed samples (a-c) are compared in FIG. 5. The peaks (1-3) observed for the control samples in the initial loading period is indicative of puncturing the outer portion of the ware by the penetrometer tip. In contrast, the samples stiffened by contact with the cesium formate bath exhibit changes in slope (a-c) rather than peaks, indicating that the stiffened samples experienced little or no puncturing of their outer portions. The fact that there is no peak after the initial loading region in the samples that were placed in the cesium formate bath shows that the stiffened wares a-c were much tougher to puncture than the control samples 1-3. The average slopes of the initial loading region plotted in FIG. 5 were 0.345 lbf/s and 0.447 lbf/s for the control samples and the samples treated with the cesium format bath, respectively. Comparison of these slopes indicate that exposure of the ware to cesium formate stiffened the periphery of the ware by approximately 25%. The stiffening is due to the formate anion causing the salting-out and gelation of the Methocel binder in the material.

While typical embodiments have been set forth for the purpose of illustration, the foregoing description should not be deemed to be a limitation on the scope of the invention. Accordingly, various modifications, adaptations, and alternatives may occur to one skilled in the art without departing from the spirit and scope of the present invention.

The invention claimed is:

1. A method of preventing gravity-induced deformation of a ceramic green body, the method comprising the steps of:
    a. providing a ceramic green body having a material composition comprising a vehicle and at least one precursor of a ceramic material, and being prone to gravity-induced deformation; and
    b. disposing the ceramic green body in a fluid medium bath, the fluid medium bath having a density that is greater than or equal to a density of the material composition of the ceramic green body, wherein the fluid medium bath supports the ceramic green body and contact between the ceramic green body and the fluid medium bath prevents deformation of the ceramic green body.

2. The method of claim 1, further including the step of strengthening at least a portion of the ceramic green body.

3. The method of claim 2, wherein the ceramic green body comprises a water soluble polymeric binder having a gelation temperature, and wherein the step of strengthening the ceramic green body comprises lowering the gelation temperature.

4. The method of claim 1, wherein the fluid medium bath is an aqueous solution comprising at least one water soluble salt selected from the group consisting of alkali metal salts, alkali earth metal salts, transition metal salts, ammonium salts, and combinations thereof.

5. The method of claim 4, wherein the fluid medium bath comprises at least one of cesium formate, cesium acetate, rubidium formate, rubidium acetate, potassium formate, potassium acetate, lithium tungstate, lithium metatungstate, lithium molybdenate, sodium tungstate, sodium metatungstate, sodium molybdenate, ammonium tungstates, ammonium metatungstates, ammonium molybdenates, ammonium formates, ammonium acetates, tetramethyl ammonia, tetraethyl ammonium, tertrapropyl ammonium, and combinations thereof.

6. The method of claim 4, wherein the at least one water soluble salt comprises from about 10 wt % up to about to 20 wt % of the fluid medium bath.

7. The method of claim 1, wherein the step of providing the ceramic green body comprises one of extruding the ceramic green body, casting the ceramic green body, and molding the ceramic green body.

8. The method of claim 1, wherein the ceramic green body is one of a honeycomb structure, a plate, a sheet, and a rod.

9. The method of claim 1, wherein the ceramic green body is one of a cordierite green body, an aluminum titanate green body, an alumina green body, an inorganic carbide green body, a zeolite green body, and combinations thereof.

10. The method of claim 1, wherein the fluid medium bath has a density in a range from about 1.5 g/cm$^3$ up to about 3 g/cm$^3$.

11. A method of strengthening a ceramic green body, the method comprising the steps of:
    a. providing the ceramic green body, the ceramic green body having a material composition comprising a water soluble polymeric binder, a vehicle, and at least one precursor of a ceramic material, and being prone to gravity-induced deformation;
    b. disposing the ceramic green body in a fluid medium bath having a density that is greater than the density of the material composition of the ceramic green body, wherein the fluid medium bath supports the ceramic green body, and
    c. reacting the fluid medium bath with the water soluble polymeric binder in a portion of the ceramic green body to gel the water soluble polymeric binder, wherein gelling the water soluble polymeric binder strengthens the portion of the ceramic green body.

12. The method of claim 11, wherein the step of reacting fluid medium bath with the water soluble polymeric binder in a portion of the ceramic green body to gel the water soluble polymeric binder comprises lowering the gelation temperature of the water soluble polymeric binder.

13. The method of claim 11, wherein the fluid medium bath is an aqueous solution comprising at least one water soluble salt selected from the group consisting of alkali metal salts, alkali earth metal salts, transition metal salts, ammonium salts, and combinations thereof.

14. The method of claim 13, wherein the fluid medium bath comprises at least one of cesium formate, cesium acetate, rubidium formate, rubidium acetate, potassium formate, potassium acetate, lithium tungstate, lithium metatungstate, lithium molybdenate, sodium tungstate, sodium metatungstate, sodium molybdenate, ammonium tungstates, ammonium metatungstates, ammonium molybdenates, ammonium formates, ammonium acetates, tetramethyl ammonia, tetraethyl ammonium, tertrapropyl ammonium, and combinations thereof.

15. The method of claim 11, wherein the step of providing the ceramic green body comprises one of extruding the ceramic green body, casting the ceramic green body, and molding the ceramic green body.

16. The method of claim 11, wherein the ceramic green body is one of a honeycomb structure, a plate, a sheet, and a rod.

17. The method of claim 11, wherein the ceramic green body is one of a cordierite green body, an aluminum titanate green body, an alumina green body, an inorganic carbide green body, a zeolite green body, and combinations thereof.

18. The method of claim 11, wherein the fluid medium bath has a density in a range from about 1.5 g/cm$^3$ up to about 3 g/cm$^3$.

19. A method of preventing gravity-induced deformation and wall collapse of a ceramic green body, the method comprising the steps of:
   a. providing the ceramic green body, the ceramic green body having a material composition comprising a water soluble polymeric binder, a vehicle and at least one precursor of a ceramic material, and being prone to gravity-induced deformation;
   b. disposing the ceramic green body in a fluid medium bath, the fluid medium bath having a density that is greater than or equal to a density of the material composition of the ceramic green body, wherein the fluid medium bath supports the ceramic green body and contact between the ceramic green body and the fluid medium bath prevents deformation of the ceramic green body; and
   c. reacting the fluid medium bath with the water soluble polymeric binder in a portion of the ceramic green body to gel the water soluble polymeric binder, wherein gelling the water soluble polymeric binder strengthens the portion of the ceramic green body, and wherein the strengthening of the portion prevents wall collapse.

20. The method of claim 19, wherein the fluid medium bath is an aqueous solution comprising at least one water soluble salt selected from the group consisting of alkali metal salts, alkali earth metal salts, transition metal salts, ammonium salts, and combinations thereof.

21. The method of claim 19, wherein the fluid medium bath comprises at least one of cesium formate, cesium acetate, rubidium formate, rubidium acetate, potassium formate, potassium acetate, lithium tungstate, lithium metatungstate, lithium molybdenate, sodium tungstate, sodium metatungstate, sodium molybdenate, ammonium tungstates, ammonium metatungstates, ammonium molybdenates, ammonium formates, ammonium acetates, tetramethyl ammonia, tetraethyl ammonium, tertrapropyl ammonium, and combinations thereof.

22. The method of claim 19, wherein the ceramic green body is one of a cordierite green body, an aluminum titanate green body, an alumina green body, an inorganic carbide green body, a zeolite green body, and combinations thereof.

23. The method of claim 19, wherein the step of providing the ceramic green body comprises one of extruding the ceramic green body, casting the ceramic green body, and molding the ceramic green body.

* * * * *